(No Model.)
M. McK. RITCH & P. McRAE.
COTTON AND CORN SWEEP.
No. 336,160. Patented Feb. 16, 1886.
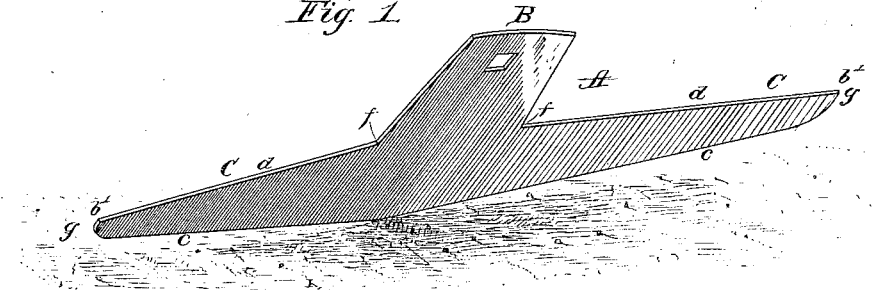
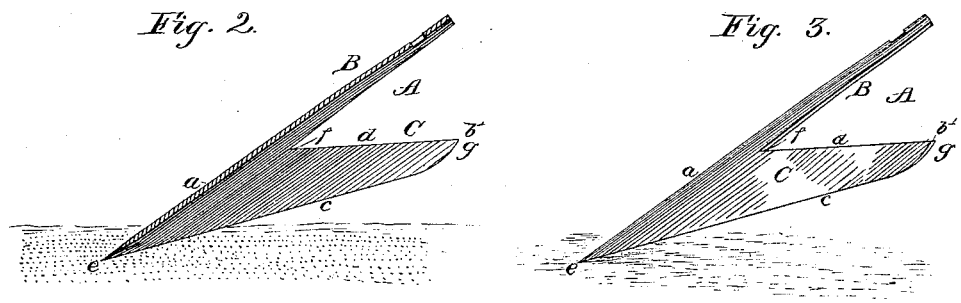
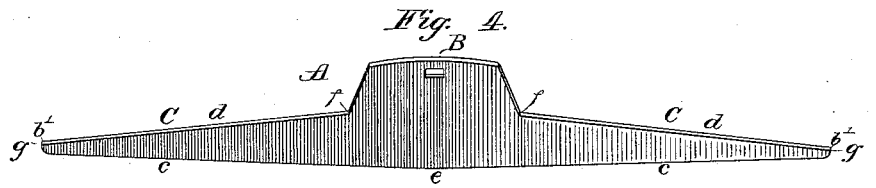
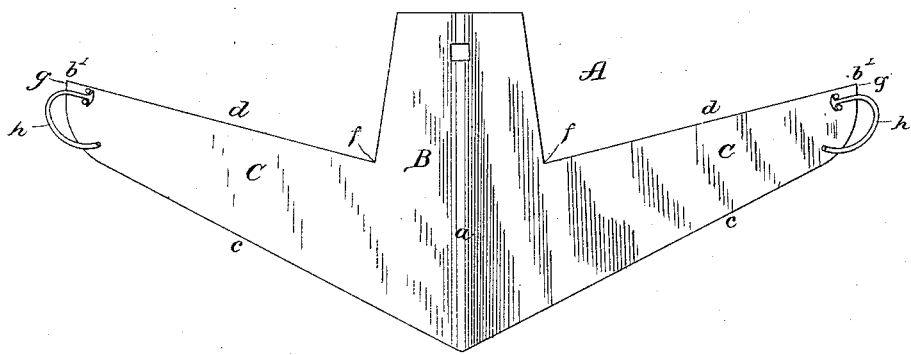
WITNESSES
Percy C. Bowen.
Edward G. Siggers
INVENTOR
Milton McK. Ritch
and Peter McRae,
By C. A. Snow & Co.
his Attorneys.

UNITED STATES PATENT OFFICE.

MILTON McKEE RITCH AND PETER McRAE, OF LAURINBURG, N. C.

COTTON AND CORN SWEEP.

SPECIFICATION forming part of Letters Patent No. 336,160, dated February 16, 1886.

Application filed August 11, 1885. Serial No. 174,132. (No model.)

*To all whom it may concern:*

Be it known that we, MILTON M. RITCH and PETER McRAE, citizens of the United States, residing at Laurinburg, in the county of Richmond and State of North Carolina, have invented a new and useful Improvement in Cotton and Corn Sweeps, of which the following is a specification, reference being had to the accompanying drawings.

This invention relates to cotton and corn sweeps or that class of plows which are designed to work between the rows of plants to clear the weeds and trash without cutting up the ground to any appreciable extent.

The object of the present invention is to construct a device of this character which will be simple and inexpensive in construction, can be applied in position with ease, and which will be labor-saving in operation, the work being performed with a thoroughness not heretofore attained.

A further object of the invention is to provide a cotton-sweep which will work nearly on a horizontal plane, so as to readily clear the weeds and trash, but avoid digging or cutting up the ground; and a still further object of the invention is to construct the side wings of the sweep with rounded blunt corners to prevent cutting or otherwise injuring the plants, and to arrange these wings on a lower horizontal plane than the center of the sweep, and thus cause the earth and trash to be deflected over each side.

With these ends in view the said invention consists in certain details of construction and in the peculiar arrangement of parts, all as hereinafter set forth, and particularly pointed out in the claims.

In the accompanying drawings, Figure 1 is a perspective view of my improved sweep. Fig. 2 is a longitudinal section of the same. Fig. 3 is a side elevation. Fig. 4 is a rear elevation. Fig. 5 is a plan view illustrating an improvement to prevent the plants from being injured.

Like letters are used to indicate corresponding parts in the several figures.

Referring to the drawings, A designates the plow or sweep, the body portion B of which has a central inclined ridge, *a*, and is provided with a bolt-hole, *b*, to receive the bolt, by means of which the device is attached to the plow-boot. The body B of the plow or sweep is provided with side wings, C C, which extend laterally nearly at a right angle to the body, so as to have a broad sweep. The central ridge, *a*, of the body B is the highest point of the plow, and from this ridge the body inclines backward or downward, joining with the side wings, which have a similar inclination. Thus from the ridge *a* to the corners *b'* of the side wings the plow or sweep has a downward inclination, which will allow the loose earth, weeds, and trash to be deflected over the wings.

The front or lower edge, *c*, of the side wings is sharpened, as shown, to form a cutting-edge, which extends in an inclined line, so as to meet the front or lower edge of the body B at the point *e*, the latter coinciding with the central ridge, *a*. The inclined cutting-edge *c* of the plow or sweep extends at an angle of about thirty degrees from the point *e*, and this we have found in practice to possess superior advantages, inasmuch as the cut will be gradual and effective, and there will be less liability of the plow binding.

The corners *b'* of the side wings are rounded and made blunt, the cutting-edge *c* terminating before the corners are reached, so that should the ends or corners of the plow touch or strike the plants they will not be cut or injured.

The upper or inner edge, *d*, of the side wings is cut off in a straight inclined line, which is highest at the outer end of the wings and lowest at the point *f*, where the latter joins with the body B. This construction causes the loose earth, weeds, and trash to pass over the wings and center toward the point *f* by reason of the downward inclination which is given to the upper edge, *d*. Thus the trash and weeds will not escape laterally over the wings onto the rows of plants, but will be collected in the space between the rows.

By turning up the point *g*, formed by the junction of the round corner *b'* with the upper edge, *d*, the earth will be caused to roll or be deflected over and around the roots of the plants.

In operation the point *e* penetrates the ground a sufficient depth, the edges, *c* of the side wings on each side cutting lightly over the edge of the ground, and thereby cleaning the grass, weeds, and trash which grow or accumulate between the plants. Since the point e is on a line with the central ridge a, which is the highest point of the plow or sweep, the earth cut up by the plow will be directed toward each of the side wings by reason of the downward or backward inclination given to the body B on each side of the central ridge.

In practice the downward or backward inclination of the side wings will be such that a horizontal line connecting the round corners b' will be two inches below a horizontal line intersecting the body portion B, this construction having been found of advantage to properly direct the grass, weeds, and earth, as before explained, and make the sweep more effective in operation.

Another important point of merit claimed for our improvement resides in the fact that the broad sweep given the plow, in connection with the disposition of the side wings relative to the body, enables the plow to work on a very low plane, which, its advantage in the fact that the cutting action of the sweep will be more positive yet slow and gradual, and, being nearly on a horizontal plane, will work with greater ease and with less liability of binding. Furthermore, should the plow or sweep strike a stone, stump, or other obstruction, it will be stopped but not thrown up out of the ground, as in the case where the plow is at a greater angle or inclination.

Our improvement will be labor saving to those using the same. It will work the ground expeditously and thoroughly, cleaning the space between the rows of all grass, trash, and weeds and freeing the plants from all impediments to their growth.

In Fig. 5 we have shown an improvement consisting of a curved spring-bar, h, secured to the outer ends of the side wings so as to extend outward, and when the bars strike the plants they will be caused to yield and thus avoid doing injury to them. These spring-bars will serve to keep the plow or sweep in line between the rows and yet allow its free progress. In some cases this spring-bar may be used to advantage in place of the rounded corners b', being more effectual in preventing injury to the plants.

Having described our invention, we claim—

1. A corn or cotton sweep comprising the body B and side wings, C C, which extend outward from the body and are inclined downward and backward from the central line thereof, the front or lower edge, c, of the wings being sharpened and extending at an angle of about thirty degrees from the point e of the body B, the edge c of the wings being rounded at the ends thereof to form corners b', which are made blunt, so as not to cut or otherwise injure the plants, as set forth.

2. A corn or cotton sweep comprising the body B, the side wings, C C, and curved spring-bars secured to the outer ends of the wings, said bars being arranged and operating for the purpose set forth.

In testimony that we claim the foregoing as our own we have hereto affixed our signatures presence of two witnesses.

MILTON McKEE RITCH.
PETER McRAE.

Witnesses:
LUTHER McCORMICK,
M. M. McKINNER.